United States Patent
Laclef et al.

(10) Patent No.: US 10,543,782 B2
(45) Date of Patent: Jan. 28, 2020

(54) CUTTING TOOL VISUAL TRAJECTORY REPRESENTATION SYSTEM AND METHOD

(71) Applicant: Caterpillar Paving Products Inc., Brooklyn Park, MN (US)

(72) Inventors: Sean Laclef, Plymouth, MN (US); Nathan L. Mashek, St. Michael, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/846,583

(22) Filed: Dec. 19, 2017

(65) Prior Publication Data
US 2019/0210525 A1    Jul. 11, 2019

(51) Int. Cl.
| | |
|---|---|
| *E01C 23/088* | (2006.01) |
| *E01C 23/12* | (2006.01) |
| *E01C 19/00* | (2006.01) |
| *E01C 23/01* | (2006.01) |
| *B60R 1/00* | (2006.01) |
| *B62D 11/20* | (2006.01) |

(52) U.S. Cl.
CPC ............... *B60R 1/00* (2013.01); *B62D 11/20* (2013.01); *E01C 19/004* (2013.01); *E01C 23/01* (2013.01); *E01C 23/088* (2013.01); *E01C 23/127* (2013.01); *B60R 2300/105* (2013.01); *B60R 2300/207* (2013.01); *B60R 2300/302* (2013.01); *B60R 2300/303* (2013.01); *E01C 2301/30* (2013.01)

(58) Field of Classification Search
CPC ...... E01C 23/088; E01C 23/127; E01C 23/01; E01C 19/004; H04N 19/521; H04N 19/527
See application file for complete search history.

(56) References Cited

U.S. PATENT DOCUMENTS

| | | | | |
|---|---|---|---|---|
| 5,631,658 | A | * | 5/1997 | Gudat ................. A01B 79/005 342/357.31 |
| 7,996,064 | B2 | | 8/2011 | Simon et al. |
| 8,977,442 | B2 | | 3/2015 | Menzenbach et al. |
| 9,121,146 | B2 | | 9/2015 | Paulsen et al. |
| 2012/0090909 | A1 | * | 4/2012 | Menzenbach ........ B62D 7/1509 180/204 |
| 2016/0060826 | A1 | | 3/2016 | Berning et al. |

(Continued)

FOREIGN PATENT DOCUMENTS

DE       102011113752 A    3/2013

*Primary Examiner* — David J Bagnell
*Assistant Examiner* — Michael A Goodwin
(74) *Attorney, Agent, or Firm* — Leydig, Voit & Mayer, Ltd.

(57) ABSTRACT

A machine includes a work implement and at least one camera arranged to capture a video image of a viewed area and provide a video signal related to the viewed area to a controller. The controller compiles a visual display in which the current position and a current direction of the work implement relative to the viewed area is displayed in real time. The controller also calculates a trajectory of the work implement based on machine speed and steering signals to compile a visual trajectory representation of the work implement relative to the viewed area, which is combined with the visual display into a combined visual representation that is presented to an operator through a video display.

19 Claims, 6 Drawing Sheets

(56) References Cited

U.S. PATENT DOCUMENTS

2016/0138247 A1   5/2016  Conway et al.
2016/0138248 A1   5/2016  Conway et al.
2016/0138249 A1   5/2016  Conway et al.
2018/0135258 A1*  5/2018  Berning ............... G05D 1/0293

* cited by examiner

CUTTING TOOL VISUAL TRAJECTORY REPRESENTATION SYSTEM AND METHOD

TECHNICAL FIELD

The present disclosure relates generally to machines for the treatment of road surfaces and, more particularly, to a cold planner or milling machine for roadway surfacing or resurfacing operations.

BACKGROUND

Milling machines such as cold planers or soil recyclers may be configured to remove, mix, or reclaim material from the surface of bituminous, concrete, dirt or asphalt roadways and other surfaces using a rotatable tool mounted on a frame. The rotatable tool may be a planing drum that grinds an existing roadway material or a similar tool such as a soil recycling drum. In either case, the rotating tool is mounted on a frame of the machine and is vertically adjustable to control a depth of cut into the ground or other surface on which the machine is operating. Depending on the type of machine, the frame may travel along the working surface using ground engaging members such as wheels, tracks and the like.

In a customary arrangement, the rotating tool is enclosed within a housing, which is open on its bottom to allow the rotating tool to contact the ground and which encloses the rotating tool on all remaining sides to both contain the milled material for collection and/or mixing and to avoid debris from being ejected from the tool during operation. Moreover, a machine operator is usually positioned either above or in front of the tool housing in typical machine configurations. The operator position, along with the enclosure of the tool, often make it difficult for the operator to know exactly where a cut will be made on the ground, especially in situations where the machine requires a change in direction during a cut.

U.S. Pat. No. 8,977,442, which issued on Oct. 3, 2015, describes a system that determines a trajectory of a machine as a function of the position of the front and rear running gear and also as a function of steering angle and mode of steering. The system described in this reference further displays an image to the operator of the view from the rear of the machine, with the calculated trajectory superimposed, to aid in maneuvering of the machine. However, these representations do not provide visual information relative to the cutting tool of the machine to the operator.

SUMMARY

The disclosure describes, in one aspect, a machine. The machine includes a frame and a plurality of ground engaging members, which are configured to move the machine along a ground surface at a machine speed and to steer the machine relative to the ground surface at a steering angle. A machine speed sensor provides a machine speed signal indicative of the machine speed, and a steering sensor providing a steering signal indicative of the steering angle. A work implement is connected to the frame and operates to cut at least a portion of the ground surface as the machine moves along the ground surface. At least one camera is associated with the frame and is arranged to capture a video image of a viewed area and provide a video signal related to the viewed area. A video display is associated with an operator cab of the machine. An electronic controller is associated with the frame.

In one embodiment, the electronic controller is programmed and configured to: receive the machine speed signal, the steering signal and the video signal, determine a current position of the work implement relative to the frame and relative to the viewed area in real time, compile a visual display in which the current position and a current direction of the work implement relative to the viewed area is displayed in real time, calculate a trajectory of the work implement based on the machine speed signal and the steering signal, compile a visual trajectory representation of the trajectory of the work implement relative to the viewed area, combine the visual display and the visual trajectory into a combined visual representation, and provide the combined visual representation to the video display.

In another aspect, the disclosure describes a cold planer. The cold planer includes a frame, a plurality of ground engaging members configured to move the cold planer along a work surface at a machine speed and to steer the cold planer relative to the work surface at a steering angle. The cold planer further includes a machine speed sensor providing a machine speed signal indicative of the machine speed, a steering sensor providing a steering signal indicative of the steering angle, a milling drum rotatably supported on the frame, at least one camera associated with the frame, the at least one camera arranged to capture a video image of a viewed area and to provide a video signal related to the viewed area, an operator cab, a video display associated with the operator cab, and an electronic controller associated with the frame.

In one embodiment, the electronic controller is programmed and configured to: receive the machine speed signal, the steering signal and the video signal, determine a current position of the milling drum relative to the frame and relative to the viewed area in real time, compile a visual display in which the current position and a current direction of the milling drum relative to the viewed area is displayed in real time as a vector, calculate a trajectory of the milling drum based on the machine speed signal and the steering signal, compile a visual trajectory representation of the trajectory of the milling drum relative to the viewed area as a curve, combine the visual display and the visual trajectory into a combined visual representation, and provide the combined visual representation to the video display.

In yet another aspect, the disclosure describes a method for operating a cold planer. The method includes providing a frame and a plurality of ground engaging members, which are configured to move the cold planer along a ground surface at a cold planer speed and to steer the cold planer relative to the ground surface at a steering angle. The method further includes providing a cold planer speed sensor providing a cold planer speed signal indicative of the cold planer speed, providing a steering sensor providing a steering signal indicative of the steering angle, providing a work implement connected to the frame, the work implement operating to cut at least a portion of the ground surface as the cold planer moves along the ground surface, providing at least one camera associated with the frame, the at least one camera arranged to capture a video image of a viewed area and to provide a video signal related to the viewed area, and providing a video display associated with an operator cab of the cold planer.

In one embodiment, the method additionally includes using an electronic controller associated with the frame to: receive the cold planer speed signal, the steering signal and the video signal; determine a current position of the work implement relative to the frame and relative to the viewed area in real time; compile a visual display in which the current position and a current direction of the work implement relative to the viewed area is displayed in real time; calculate a trajectory of the work implement based on the cold planer speed signal and the steering signal; compile a visual trajectory representation of the trajectory of the work implement relative to the viewed area; combine the visual display and the visual trajectory into a combined visual representation; and provide the combined visual representation to the video display.

BRIEF DESCRIPTION OF THE DRAWING(S)

DETAILED DESCRIPTION

This disclosure relates to surface working machines such as cold planers, soil recyclers, scrapers, tillers and the like. The exemplary machine embodiment illustrated and described herein is a cold planer, which is a machine that travels along a road or other surface and grinds or planes the surface to remove a layer of material. While this exemplary embodiment illustrates the various aspects of the disclosure, it should be appreciated that any other machine type or configuration, which includes a ground-penetrating tool that penetrates the surface on which the machine is disposed, and covers a work area while the machine travels along the surface, to produce a strip of worked-surface, is applicable to, and can benefit from, the various systems and methods described herein.

Figure 1:
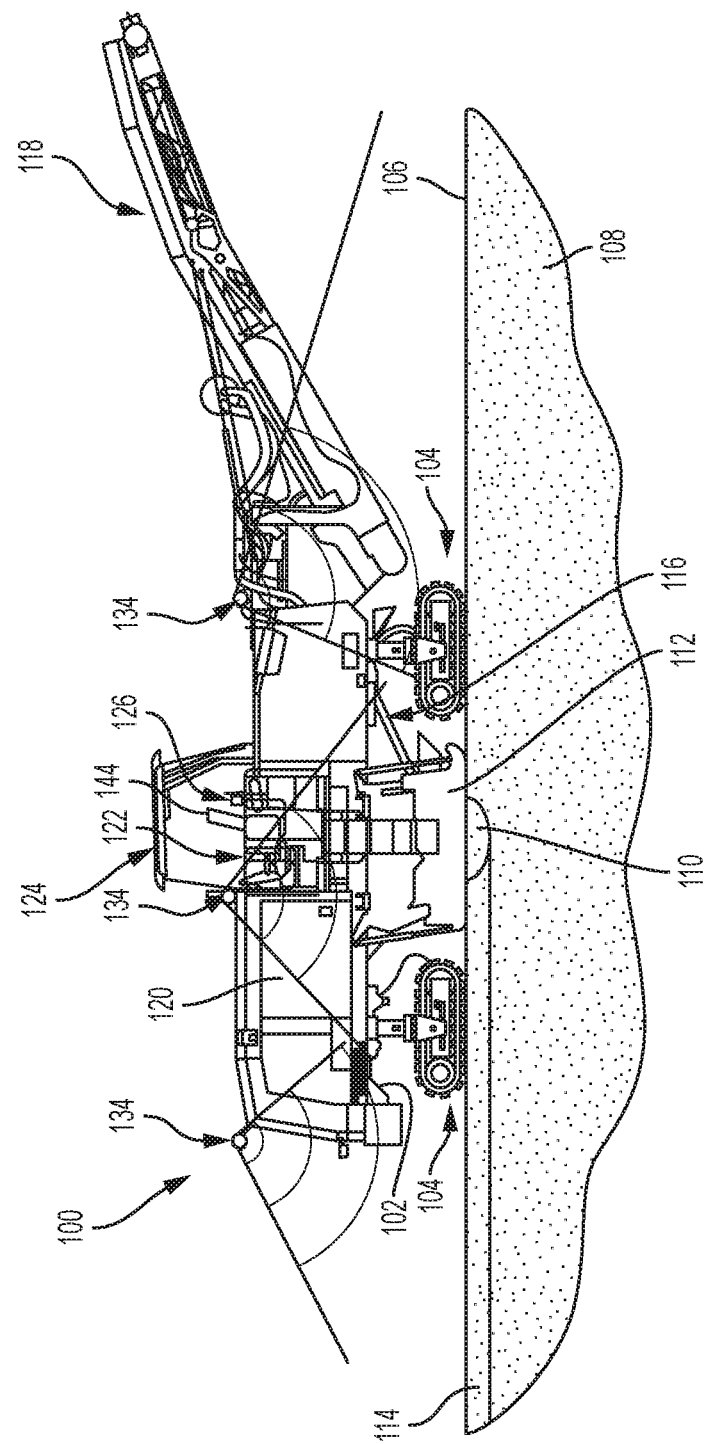
FIG. 1 is an outline view from a side perspective of a cold planer machine in accordance with the disclosure.
Figure 2:
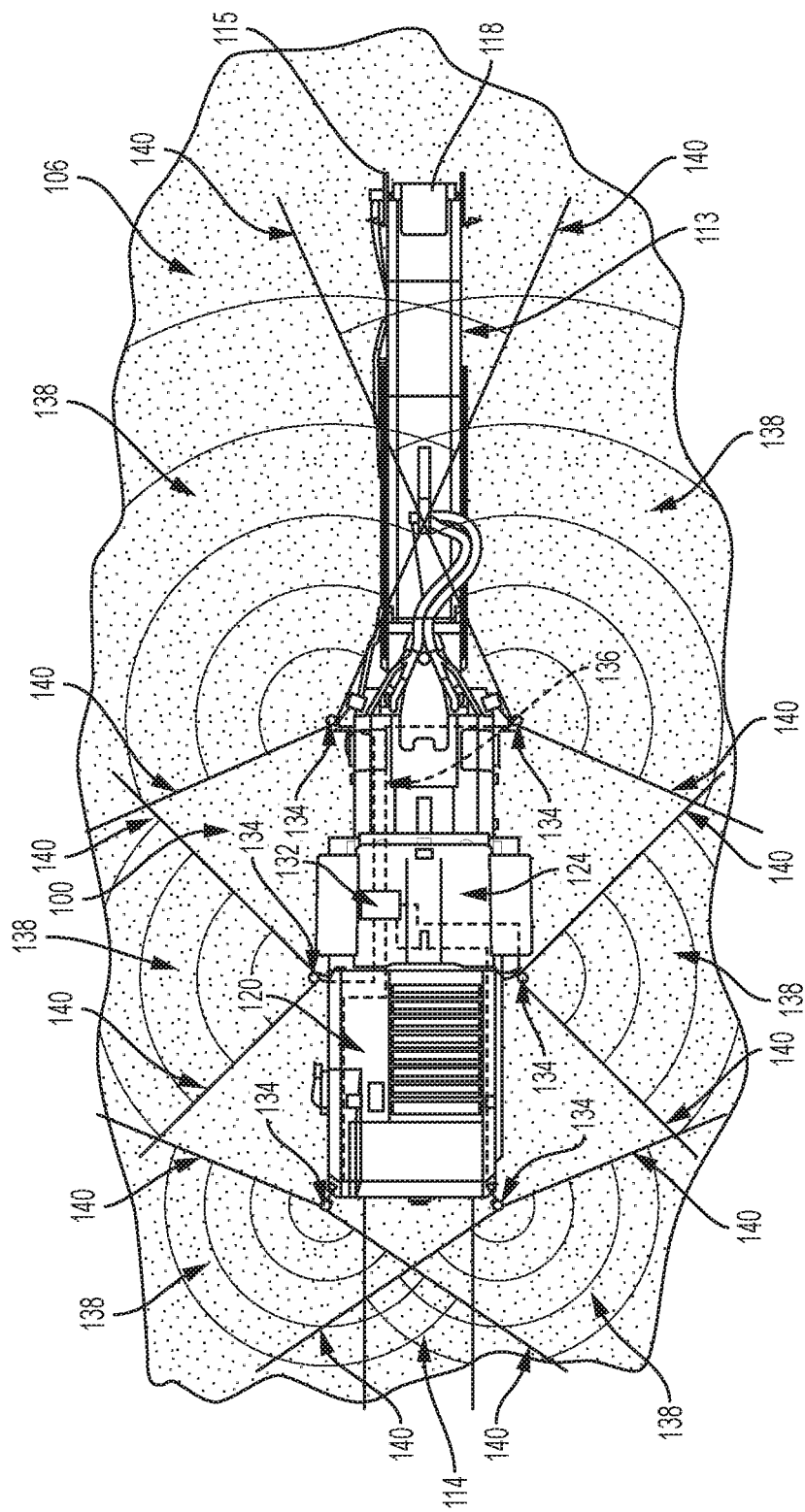
FIG. 2 is an outline view from a top perspective of a cold planer machine in accordance with the disclosure.

An outline view from a side perspective of a machine 100 is shown in FIG. 1. FIG. 2 shows an outline view of the machine 100 from a top perspective. In reference to these figures, the machine 100 includes a frame 102. Supporting the frame are two tracks 104, which are height-adjustable relative to the frame 102 such that the frame 102 can travel along a surface 106 of the ground 108 at a selectively adjustable height. Supported by the frame 102 is a milling drum 110, which is enclosed in an enclosure 112. The milling drum 110 can engage the ground 108 through an open bottom of the enclosure 112. The degree of engagement of the milling drum 110 with the ground 108, and also the depth of a resulting trench 114, can be controlled by the height of the frame 102 from the ground 108 and/or a mechanism (not shown) for adjusting the distance between the frame 102 and the milling drum 110. Debris generated during the milling operation within the enclosure 112 is collected and removed by a conveyor 113 disposed along a boom 115 for offloading into a truck (not shown) in the known fashion.

The machine 100 further includes a conveyor system 116 that collects debris from an area within the enclosure, and carries the debris away, via a boom 118, in the known fashion. The machine 100 may be powered by an engine 120 and controlled by an operator occupying an operator's cab 122. The operator's cab 122, which can include a roof 124, includes controls and displays 126, which the operator may use to control the machine 100 and also receive feedback on various operating parameters of the machine 100. As can be seen from FIGS. 1 and 2, the operator's cab 122 is disposed above the enclosure 112 which houses the milling drum 110 such that, during operation, it is impossible for an operator occupying the operator's cab 122 to visually monitor the milling drum 110 and determine where a cut will be made. This condition, which is shared across many different machine types and configurations, has not previously been addressed in a satisfactory fashion.

For example, machine operators have, in the past, worked in pairs or teams such that operators walk along the machine 100 and provide feedback to another operator controlling the machine 100 from the operator's cab 122. While such concerted effort may be acceptable for determining where a cut will be made when the machine 100 operates in a straight line, the location of the cut when the machine is turning, for example, to avoid an obstacle in the milling operation such as a manhole cover or a curb, is more difficult to determine even for experienced operators. Moreover, the necessity of engaging more than one operator to ensure that a precise cut is made increases the cost and complexity of a cutting or planing operation.

Figure 3:
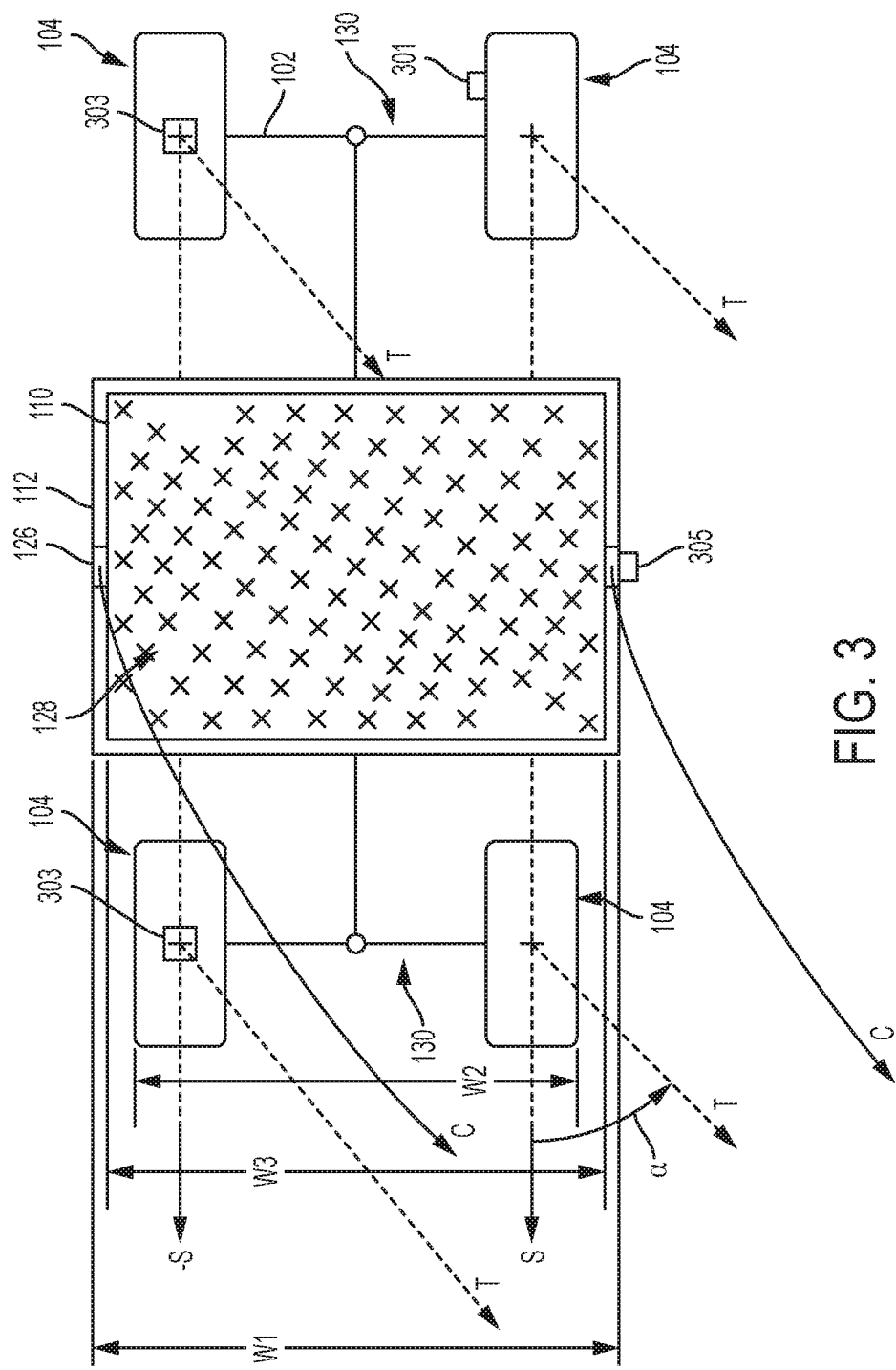
FIG. 3 is a schematic view of ground interacting members of the machine of FIGS. 1 and 2.

A schematic representation of the machine 100 is shown in FIG. 3 for illustration. In reference to this figure, where structures previously introduced are denoted by the same reference as previously used for simplicity, the machine 100 includes the frame 102, which rotatably supports the milling drum 110 that is rotated by one or more motors 126 and can be raised or lowered by actuators (not shown) in the known fashion. The frame 102 includes the four tracks 104, which are powered by motors (not shown) for advancing the machine along the ground. The milling drum 110 includes a plurality of cutter tools 128 that engage and grind the ground surface while the milling drum 110 is rotating and the machine is advancing relative to the ground during a planing operation. As is typical with machines of this type, two or more of the tracks 104 can pivot relative to the frame 102 such that the machine 100 can steer in any desired direction.

The unique steering capability of the machine 100 is advantageous for the type of operation of the machine especially when conducting planing operations around obstacles or in confined areas, but it can also complicate the operation of the machine by the operator, especially less experienced operators, insofar as the steering of the machine can occur at either or both axles 130 of the frame 102. For example, when the machine 100 is travelling in a straight direction, S, as denoted by the dash-dot-dashed arrows, all four tracks 104 may be pointed straight. As two 104 are turned by an angle, a, as shown in FIG. 3, in a turning direction, T, denoted dashed-line arrows, the machine will take on a turning, curved trajectory, C, denoted by the solid arrows.

The shape and radius of the turn C will change depending on the turn angle of the tracks 104 on each axle 130, which effect is quite unique for the machine 100 over known turn radii of turning vehicles such as trucks or cars having turning wheels on one or two axles. This is because, while a ratio of turning angle is predefined in such vehicles and cannot be changed by the driver, the ratio of the tracks 104 on the axles 130 may be freely selectable and adjustable by the operator. Additionally, what is of interest to the operator of the machine 100 is the trajectory of the milling drum 110 and not the trajectory of the machine 100 or the tracks 104 in general. Determination of the trajectory of the milling drum 110 is further hampered in that the width W1 of the enclosure 112 is larger than a track width W2 and also larger than a milling drum width W3, as shown in FIG. 3, so visual cues of the operator relative to visible machine components may be confusing and misleading in determining the true trajectory of the milling drum 110 in real time during operation.

To aid the operator in determining by visual information the trajectory of the milling drum 110 with precision, a plurality of cameras or other visual transducer devices that are disposed around the machine 100 and, at least, towards the front travelling direction of the machine 100, and configured to provide a signal containing visual information to a controller 132 (FIG. 2), which compiles and displays, in real time, a trajectory of the milling drum 110 based on the speed and turn angle of all tracks 104 during machine operation.

More specifically, the machine 100 may include at least one camera 134 that is mounted to the machine frame 102 or another machine structure and operates to provide a visual or video signal to the controller 132 wirelessly or through a communication line 136. In the illustrated embodiment, six possible locations for cameras 134 are shown around the machine, where two cameras each are viewing areas in the front, rear and both sides of the machine, but it should be appreciated that as few as one camera 134 viewing an area in front of the machine may be used. Each camera 134 is arranged to cover a viewed area 138 that extends to the ground within a viewing angle defined between two view angle lines 140. In an embodiment such as the embodiment shown in FIG. 2 where multiple cameras 134 are used, the view angle lines 140 may cross such that the viewed areas 138 from adjacent cameras 134 at least partially overlap to provide a fill view coverage. In this embodiment, the various video signals provided to the controller 132 may be stitched together by the controller in the overlap areas to provide a comprehensive view of any viewing aspect relative to the machine, including a top perspective view, to the operator via a visual display 144 disposed in the operator's cab 122.

The visual display 144 is connected to the controller 132 and configured to receive therefrom information indicative of one or more views of the cameras 134 that is stitched, compiled or otherwise processed and provided to the visual display by the controller 132. One possible embodiment of the visual display 144, and exemplary information that may be displayed thereon, is shown in two operating configurations in FIGS. 4 and 5. In reference to these figures, the visual display 144 may be an electronic video display such as a liquid crystal display (LCD) or similar viewing device, and can include an electronic display screen 202 surrounded by a frame 204. The electronic display screen 202 may be a simple display or it may alternatively be a touch display allowing the user to provide input gestures on the display that are communicated to the controller such as selection of views, zooming and the like.

Figure 4:
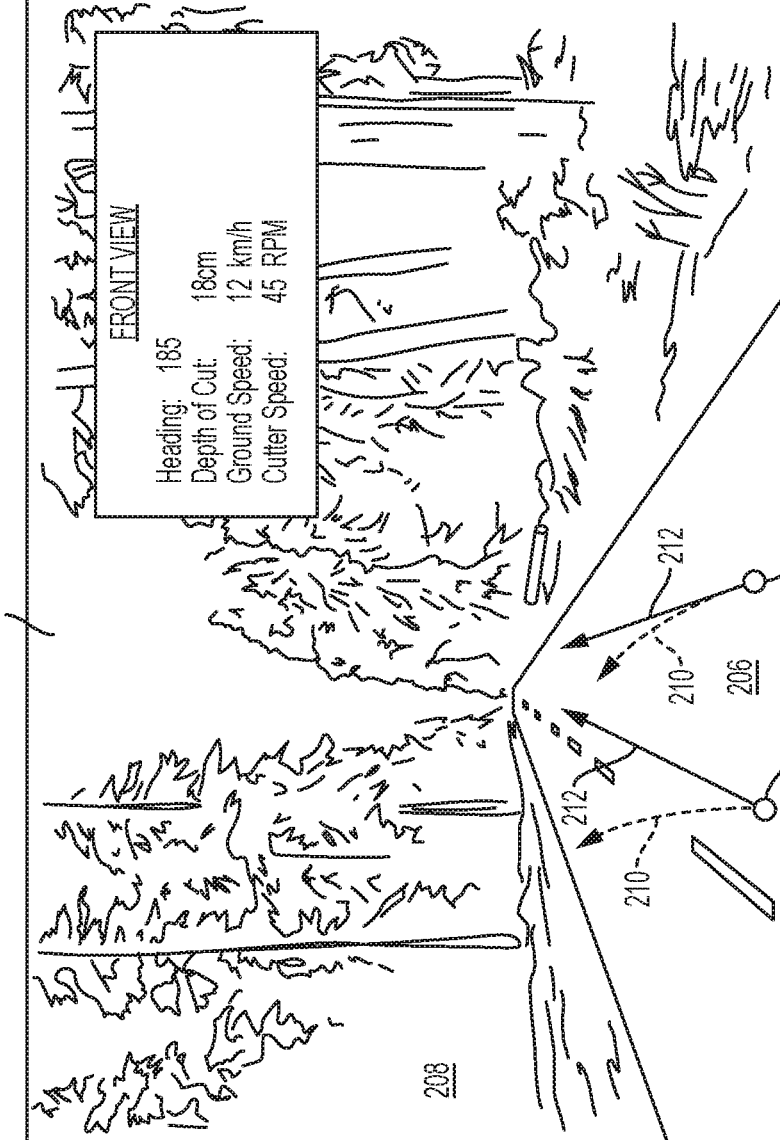
FIG. 4 is a visual display for use on a machine in accordance with the disclosure.
Figure 5:
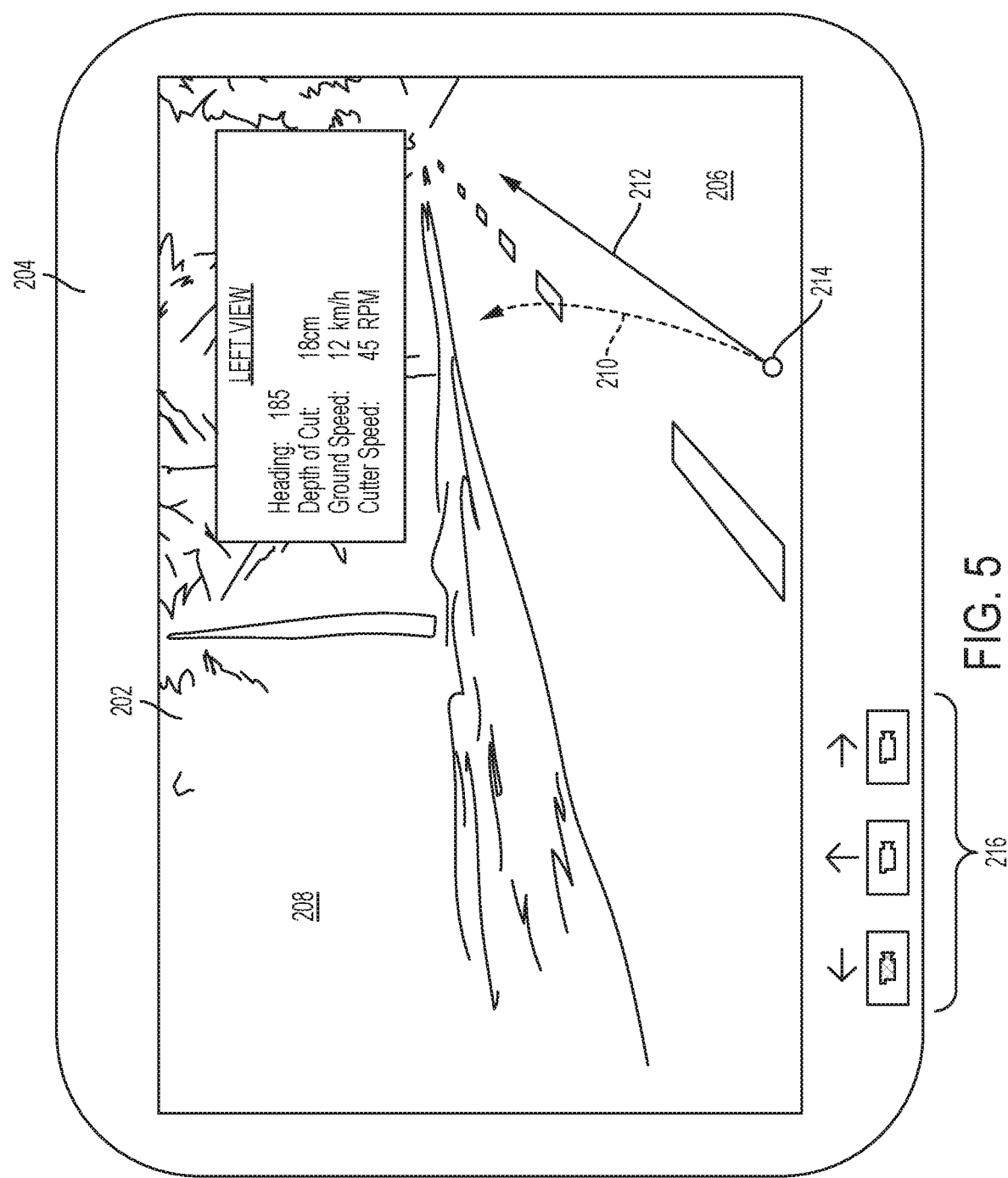
FIG. 5 is an alternative scene of the visual display of FIG. 4.

In the illustrated embodiment, the visual display 144 can be used to show to the operator working parameter illustrations from different perspectives. For example, a front view of the machine 100 is shown in FIG. 4 and a left-side view of the machine 100 is shown in FIG. 5. Notably, the front view of the machine 100 during operation, as shown in FIG. 4, can be stitched together by the controller 132 to omit or hide the boom 115 and provide the operator with a clear view of the area ahead of the machine 100 as the machine progresses during a planing operation and also when the machine is travelling to or from a worksite. The omission of the boom 115, which is optional, can be accomplished by the overlapping viewed areas 138 in the front of the machine 100 when more than one camera 134 is utilized. As can be appreciated, depending on the number of cameras 134 and their placement on the machine 100, views in addition to the ones shown in FIGS. 4 and 5 can be created and made available to the operator.

In the particular, exemplary embodiments illustrated in FIGS. 4 and 5, each view includes a video image of the work area 206 of the machine 100 in the foreground, as well as the surrounding environment or background 208 around the work area 206. Based on geometrical information of the machine such as the location of the operator's cab 122 with respect to the tracks 104, the milling drum 110, the one or more cameras 134 and others, as well as operating parameters of the machine such as ground speed and turning angle of the tracks 104 with respect to the frame 102, all of which are provided to the controller 132, the controller 132 is programmed and configured to interpolate, calculate or otherwise determine the trajectory C (FIG. 3) of the milling drum as the machine 100 is moving, either in a straight line or performing a simple or compound turn. This determination in the controller can be carried out based on known or predefined effects of speed, turning radius, depth of cut and the like, in real time, based on information received and processed in this fashion in the controller.

The result of the trajectory determination in the controller may be visually displayed in the visual display 144 as a line or curve 210, which is superimposed or overlaid onto the work area 206 on the visual display 202, and is arranged to coincide, on the image, with an actual edge of a cut that the milling drum will perform if the machine continues to travel under the current set of speed and turning inputs or parameters. The curve 210 represents an expected margin or edge of the milling drum 110 as it will result on the ground in the location of the ground that is represented in the visual display 144, in real time. The curve 210 is represented in a dashed line arrow in FIGS. 4 and 5. Also represented in these figures, in a solid line arrow, is a line 212, which represents the actual edges of the milling drum with respect to the image shown. The lines 212 point in a direction that represents a normal projection of corresponding vectors that are coplanar and perpendicular to a rotation axis of the milling drum. The lines 212 may have a magnitude that, qualitatively, represents a speed of the machine, and aid the operator in determining the direction in which the cutting operation is occurring at any given time. In this live display that is provided to the operator, the lines 212 and curves 210 intersect at a point 214 that represents the actual edge of the milling drum 110 onto the ground.

In one embodiment, for example, when the machine 100 is used to make successive cuts over the same area, the lines 212 may be selected such that they coincide with a cut line that was made during a first cut such that subsequent cuts can be aligned with previous cuts. In this embodiment, the images from the cameras 134 can be used, for example, in conjunction with a global positioning system (GPS) to illustrate lines that demark a previous cut line such that the operator of the machine 100 can steer the machine by using the lines 212 and/or dots or points 214 to follow the previous cut lines.

The visual display 144 may further include other features and structures. For example, the illustrated embodiment includes a number of selector switches 216 that can be used by the operator to cycle through or select different perspectives or views relative to the machine. For example, a front perspective view is shown in FIG. 4 and a left side, enlarged perspective view is shown in FIG. 5.

INDUSTRIAL APPLICABILITY

The present disclosure is applicable to machines that work on a ground surface such as a planing machine, and relates to surface working machines such as cold planers, soil recyclers, scrapers, tillers and the like. The exemplary machine embodiment illustrated and described herein is a cold planer, which is a machine that travels along a road or other surface and grinds or planes the surface to remove a layer of material. While this exemplary embodiment illustrates the various aspects of the disclosure, it should be appreciated that any other machine type or configuration, which includes a ground-penetrating tool that penetrates the surface on which the machine is disposed, and covers a work area while the machine travels along the surface, to produce a strip of worked-surface, is applicable to, and can benefit from, the various systems and methods described herein.

Figure 6:
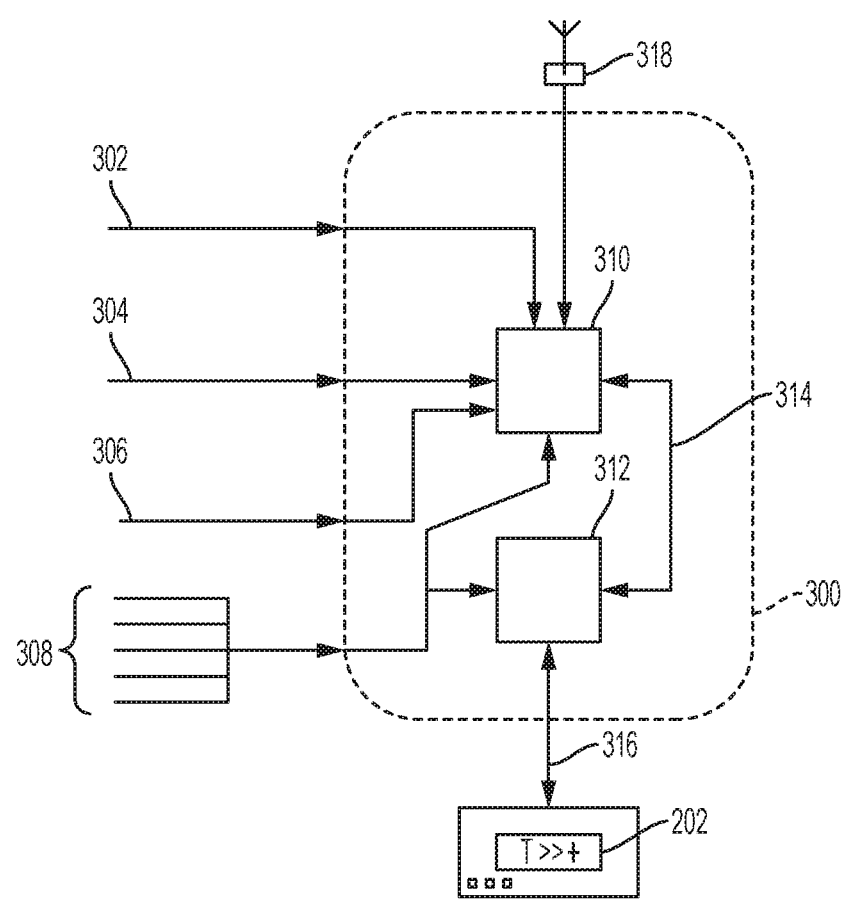
FIG. 6 is a is a block diagram for an electronic controller in accordance with the disclosure.

A block diagram for an electronic controller 300 in accordance with the disclosure is shown in FIG. 6. The electronic controller 300 may be a single controller or may include more than one controller disposed to control various functions and/or features of a machine. For example, a master controller, used to control the overall operation and function of the machine, may be cooperatively implemented with a controller used to control the visual display 202. In this embodiment, the term "controller" is meant to include one, two, or more controllers that may be associated with the machine 100 and that may cooperate in controlling various functions and operations of the machine 100 (FIG. 1). The functionality of the controller, while shown conceptually in FIG. 6 to include various discrete functions for illustrative purposes only, may be implemented in hardware and/or software without regard to the discrete functionality shown. Accordingly, various interfaces of the controller are described relative to components of the drive system shown in the block diagram of FIG. 6. Such interfaces are not intended to limit the type and number of components that are connected, nor the number of controllers that are described.

The electronic controller 300 is configured to receive various inputs from various systems and sensor of the machine 100, and to compile visual representations that are provided to aid the operator during a planing operation. In the particular, exemplary embodiment shown, and in further reference to the schematic of the machine shown in FIG. 3, the electronic controller 300 may receive a machine speed signal 302 provided by a speed sensor 301 (FIG. 3) that is associated with a track 104 or which is otherwise configured to provide the speed signal 302 that is indicative of the speed of the machine 100 relative to the ground. The electronic controller 300 may further receive a turn signal 304 provided by turn sensors 303 associated with each of the axles 130 of the machine 100. The turn signal(s) 304 are indicative of the degree of turn of each axle 130. The electronic controller 300 may further receive a milling drum signal 306, which is indicative of one or more operating parameters of the milling drum 110 including, for example, whether the drum is rotating, the speed of rotation of the drum, the cutting depth of the drum, the direction of rotation of the drum, and/or other parameters. Information about the milling drum may be provided to the electronic controller 300 from one or more sensors, which are denoted by 305 in FIG. 3 for illustration.

The electronic controller 300, which may be operating in or be embodied as the controller 132 (FIG. 2), is also configured to receive one or more video signals 308 from various cameras, such as the cameras 134, disposed on the machine 100 and viewing different areas around the machine during operation, as previously described relative to FIG. 2. The video signals 308 are provided to a video module 312, which operates to combine the various signals and stitch together perspective views around the machine. These perspective views 314 are provided to a cutting position calculator 310, which combines the other operating parameters of the machine, including but not limited to the machine speed signal 302, the turn signals 304, the milling drum signal 306, and/or others, to calculate the cutting location and trajectory of the milling drum, as described above. The cutting position calculator 310 can thus create the curves and lines 210 and 212 and generate a video overlay signal that is provided back to the video module 312. The video module 312 can then provide a video feed 316 to a display such as the visual display 202 that includes a perspective view around the machine with current and projected trajectory information relative to the milling drum, as shown in FIGS. 4 and 5. The visual display may further indicate machine operating information such as a machine heading, cutting parameters such as a depth of cut, the ground speed, a cutter speed and other parameters as shown in the exemplary illustrations of FIGS. 4 and 5.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine, comprising:
   a frame;
   a plurality of ground engaging members, the plurality of ground engaging members configured to move the machine along a ground surface at a machine speed and to steer the machine relative to the ground surface at a steering angle;
   a machine speed sensor providing a machine speed signal indicative of the machine speed;
   a steering sensor providing a steering signal indicative of the steering angle;
   a work implement connected to the frame, the work implement operating to cut at least a portion of the ground surface as the machine moves along the ground surface, wherein the work implement is enclosed within an enclosure connected t the frame;

at least one camera associated with the frame, the at least one camera arranged to capture a video image of a viewed area and to provide a video signal related to the viewed area, wherein the viewed area does not include any portion of the work implement;

a video display associated with an operator cab of the machine; and an electronic controller associated with the frame, the electronic controller being programmed and configured to:
  receive the machine speed signal, the steering signal and the video signal;
  determine a current position of the work implement relative to the frame and relative to the viewed area in real time;
  compile a visual display in which the current position and a current direction of the work implement relative to the viewed area is displayed in real time;
  calculate a trajectory of the work implement based on the machine speed signal and the steering signal;
  compile a visual trajectory representation of the trajectory of the work implement relative to the viewed area;
  combine the visual display and the visual trajectory representation into a combined visual representation; and
  provide the combined visual representation to the video display.

2. The machine of claim 1, wherein the plurality of ground engaging members is a set of four tracks arranged in two pairs of tracks, each pair of tracks arranged across a corresponding one of two axles of the frame, and wherein each of the two pairs of tracks is selectively steerable in unison relative to the frame in response to an operator command such that a resulting compound angle changes a path of the machine along the ground surface.

3. The machine of claim 1, wherein the work implement is a milling drum that is rotatably mounted to the frame and disposed within the enclosure.

4. The machine of claim 3, wherein the operator cab is mounted to the frame at a location above the enclosure such that the milling drum is not readily visible to an operator of the machine when the operator occupies the operator cab.

5. The machine of claim 1, further comprising a plurality of cameras, wherein the at least one camera is one of the plurality of cameras and wherein each of the plurality of cameras is configured to view a corresponding viewed area and provide a corresponding video signal from a plurality of video signals to the electronic controller.

6. The machine of claim 5, wherein adjacent corresponding viewed areas at least partially overlap, and wherein the electronic controller is further programmed and configured to stitch together two or more corresponding viewed areas into different perspective views around the machine.

7. The machine of claim 6, wherein the video display is configured to show any one of the different perspective views.

8. A cold planer including a frame, a plurality of ground engaging members configured to move the cold planer along a work surface at a machine speed and to steer the cold planer relative to the work surface at a steering angle, the cold planer further comprising:

a machine speed sensor providing a machine speed signal indicative of the machine speed;

a steering sensor providing a steering signal indicative of the steering angle;

a milling drum rotatably supported on the frame; the milling drum being enclosed within an enclosure connected to the frame such that the milling drum is not visible from at least one camera associated with the frame, the at least one camera arranged to capture a video image of a viewed area and to provide a video signal related to the viewed area, wherein the viewed area does not include any portion of the milling drum;

an operator cab;

a video display associated with the operator cab; and an electronic controller associated with the frame, the electronic controller being programmed and configured to:
  receive the machine speed signal, the steering signal and the video signal;
  determine a current position of the milling drum relative to the frame and relative to the viewed area in real time;
  compile a visual display in which the current position and a current direction of the milling drum relative to the viewed area is displayed in real time as a vector;
  calculate a trajectory of the milling drum based on the machine speed signal and the steering signal;
  compile a visual trajectory representation of the trajectory of the milling drum relative to the viewed area as a curve;
  combine the visual display and the visual trajectory representation into a combined visual representation; and
  provide the combined visual representation to the video display.

9. The cold planer of claim 8, wherein the plurality of ground engaging members is a set of four tracks arranged in two pairs of tracks, each pair of tracks arranged across a corresponding one of two axles of the frame, and wherein each of the two pairs of tracks is selectively steerable in unison relative to the frame in response to an operator command such that a resulting compound angle changes a path of the cold planer along the work surface.

10. The cold planer of claim 8, wherein the operator cab is mounted to the frame at a location above the enclosure such that the milling drum is not readily visible to an operator of the cold planer when the operator occupies the operator cab.

11. The cold planer of claim 8, further comprising a plurality of cameras, wherein the at least one camera is one of the plurality of cameras and wherein each of the plurality of cameras is configured to view a corresponding viewed area and provide a corresponding video signal from a plurality of video signals to the electronic controller.

12. The cold planer of claim 11, wherein adjacent corresponding viewed areas at least partially overlap, and wherein the electronic controller is further programmed and configured to stitch together two or more corresponding viewed areas into different perspective views around the cold planer.

13. The cold planer of claim 12, wherein the video display is configured to show any one of the different perspective views.

14. A method for operating a cold planer, comprising:
providing a frame;
providing a plurality of ground engaging members, the plurality of ground engaging members configured to move the cold planer along a ground surface at a cold planer speed and to steer the cold planer relative to the ground surface at a steering angle;

providing a cold planer speed sensor providing a cold planer speed signal indicative of the cold planer speed;

providing a steering sensor providing a steering signal indicative of the steering angle;

providing a work implement connected to the frame, the work implement operating to cut at least a portion of the ground surface as the cold planer moves along the ground surface, the work implement being enclosed within an enclosure attached to the frame such that the work implement is not visible from the outside the enclosure;

providing at least one camera associated with the frame, the at least one camera arranged to capture a video image of a viewed area and to provide a video signal related to the viewed area, wherein the viewed area does not include any portion of the work implement;

providing a video display associated with an operator cab of the cold planer; and using an electronic controller associated with the frame to:

receive the cold planer speed signal, the steering signal and the video signal;

determine a current position of the work implement relative to the frame and relative to the viewed area in real time;

compile a visual display in which the current position and a current direction of the work implement relative to the viewed area is displayed in real time;

calculate a trajectory of the work implement based on the cold planer speed signal and the steering signal;

compile a visual trajectory representation of the trajectory of the work implement relative to the viewed area;

combine the visual display and the visual trajectory representation into a combined visual representation; and provide the combined visual representation to the video display.

15. The method of claim 14, wherein the plurality of ground engaging members is a set of four tracks arranged in two pairs of tracks, each pair of tracks arranged across a corresponding one of two axles of the frame, and wherein each of the two pairs of tracks is selectively steerable in unison relative to the frame in response to an operator command such that a resulting compound angle changes a path of the cold planer along the ground surface.

16. The method of claim 14, wherein the work implement is a milling drum that is rotatably mounted to the frame and disposed within the enclosure.

17. The method of claim 14, further comprising providing a plurality of cameras, wherein the at least one camera is one of the plurality of cameras and wherein each of the plurality of cameras is configured to view a corresponding viewed area and provide a corresponding video signal from a plurality of video signals to the electronic controller.

18. The method of claim 17, wherein adjacent corresponding viewed areas at least partially overlap, and wherein the method further comprises using the electronic controller to stitch together two or more corresponding viewed areas into different perspective views around the cold planer.

19. The method of claim 18, wherein the video display is configured to show any one of the different perspective views.

* * * * *